United States Patent
Darvas et al.

(10) Patent No.: US 9,901,897 B2
(45) Date of Patent: Feb. 27, 2018

(54) MESOFLUIDIC REACTOR WITH PULSING ULTRASOUND FREQUENCY

(71) Applicant: Cominnex Zrt, Budapest (HU)

(72) Inventors: Ferenc Darvas, Budapest (HU); László Csaba Lengyel, Göd (HU); Teréz Vágó, Mogyoród (HU)

(73) Assignee: Cominnex ZRT, Budapest (HU)

( * ) Notice: Subject to any disclaimer, the term of this patent is extended or adjusted under 35 U.S.C. 154(b) by 0 days.

(21) Appl. No.: 15/301,311

(22) PCT Filed: Mar. 31, 2015

(86) PCT No.: PCT/HU2015/000031
§ 371 (c)(1),
(2) Date: Sep. 30, 2016

(87) PCT Pub. No.: WO2015/150845
PCT Pub. Date: Oct. 8, 2015

(65) Prior Publication Data
US 2017/0021328 A1    Jan. 26, 2017

(30) Foreign Application Priority Data

Mar. 31, 2014 (HU) .................................. 1400180

(51) Int. Cl.
*B01J 19/26* (2006.01)
*B01J 4/00* (2006.01)

(52) U.S. Cl.
CPC ............... *B01J 19/26* (2013.01); *B01J 4/002* (2013.01); *B01J 2219/00074* (2013.01); *B01J 2219/00119* (2013.01); *B01J 2219/00159* (2013.01)

(58) Field of Classification Search
CPC .. B01J 19/26; B01J 4/002; B01J 2219/00074; B01J 2219/00119; B01J 2219/00159
See application file for complete search history.

(56) References Cited

U.S. PATENT DOCUMENTS

| 5,359,947 A | 11/1994 | Wagner |
| 5,833,892 A | 11/1998 | Gurav et al. |

(Continued)

FOREIGN PATENT DOCUMENTS

| WO | 2010111288 A2 | 9/2010 |
| WO | 2012033786 A1 | 9/2011 |
| WO | 2013050402 A1 | 10/2012 |

OTHER PUBLICATIONS

International Search Report for PCT/HU2015/000031, dated Dec. 7, 2015; 4 pages.

(Continued)

*Primary Examiner* — Lessanework Seifu (74) *Attorney, Agent, or Firm* — Fitch, Even, Tabin & Flannery LLP (57) ABSTRACT

A mesofluidic reactor performs a chemical reaction of a starting material. A liquid phase starting material is introduced into a spraying head equipped with an ultrasound generating piezoelectric crystal unit. An inert/reagent gas feeds into the spraying head, connected to a reactor tube arranged within a thermally insulated multi-zone heating unit. For solid phase, an inert/reagent gas is introduced into a solids container connected to a spraying head equipped with an ultrasound generating piezoelectric crystal unit. The spraying head connects to a reactor tube arranged within a thermally insulated multi-zone heating unit. In either case, a reactor tube outlet connects to a cooled product trap to collect conversed substances. The spraying head generates a particle size distribution with nano and micro sized particles for the liquid phase and nano, micro or larger particles for the solid phase. The inert/reagent gas is preheated over the piezoelectric crystal unit's surface.

18 Claims, 3 Drawing Sheets

(56) References Cited

U.S. PATENT DOCUMENTS

2003/0221589 A1  12/2003  Lee et al.
2003/0230819 A1  12/2003  Park et al.
2008/0251006 A1  10/2008  Didenko et al.
2011/0082024 A1   4/2011  Liu et al.
2011/0281112 A1  11/2011  Chang et al.

OTHER PUBLICATIONS

J. Yoshida, et al.; "Flash Chemistry: Fast Chemical Synthesis by Using Microreactors"; Chemistry—A European Journal 14(25), pp. 7450-7459, 2008.
"Arrhenius relation" printout from Wikipedia at en.wikipedia.org/wiki/Arrhenius_equation; 4 pages; dated Feb. 7, 2012.

| id | Ultrasound frequency (MHz) | Liquid flow (mL/min) | Isolated yield (%) |
|---|---|---|---|
| 0 | 0,5 | 0,5 | 60 |
| 1 | 0,8 | 1 | 55 |
| 2 | 1,2 | 0,5 | 70 |
| 3 | 1,5 | 0,6 | 80 |
| 4 | 1,7 | 0,4 | 91 |
| 5 | 2,4 | 0,5 | 82 |
| 6 | 3 | 0,3 | 77 |

Details of selected Simplex history step

MESOFLUIDIC REACTOR WITH PULSING ULTRASOUND FREQUENCY

CROSS-REFERENCE TO RELATED APPLICATIONS

This application is the National Stage of International Application No. PCT/HU2015/000031, filed Mar. 31, 2015, which claims the benefit of Hungarian Patent Application No. P1400180 filed Mar. 31, 2014.

FIELD OF THE INVENTION

The invention relates to chemical reactors. Particularly, the present invention is related to an apparatus, implemented as a mesofluidic reactor, for performing vacuum flash pyrolysis (VFP) reactions, said apparatus having ultrasonic spraying to reduce particle size distribution, i.e. to increase dispersity of the solutions/solid reagents required for the reactions taking place in the apparatus along with inert/reagent gas feeding.

BACKGROUND OF THE INVENTION

The demand for reactors carrying out reactions in a controlled manner at high temperatures and high pressures, preferably in as short a time period as possible, has been continuously grown in the past decades. Such reactors has come to the fore, among others, due to the growing demand for fastness and low-level by-product production.

This led to a novel scientific field, simply called 'flash chemistry' in the English terminology. Reactors carrying out reactions falling into this field are the so-called flash reactors. The most important features of this field were summarized by J. Yoshida et al (see "Flash Chemistry: Fast Chemical Synthesis by Using Microreactors"; Chemistry—A European Journal 14(25), pp. 7450-7459, 2008). A distinctive feature of such devices is the rapid temperature control which can be achieved by means of a quick feedback, as well as efficient heat exchange and/or heat transport. As the residence time of a reagent mixture is short in such a reactor, these reactors are also capable of performing reactions that are more selective than what is conventional.

To perform a chemical reaction, selecting the temperature is critical for several reasons. Firstly, the rate of a chemical reaction increases by temperature (see e.g. the well-known Arrhenius relation—K. J. Laidler, Chemical Kinetics, Third Edition (1997), Benjamin-Cummings). Secondly, to initiate a reaction, it is required that the activation energy is transferred to the reaction mixture, mostly in the form of heat. However, the higher the temperature of the reaction is and/or the longer the compounds (initial reactants, products, solvent(s), further auxiliary substances and additives) participating in the reaction are exposed to high temperature, the more and the higher amount of undesired by-products and decomposition products appear in the reaction mixture. Further increase in temperature will also result in reaching the boiling temperature of the reaction mixture, which is undesired in chemical reactions carried out e.g. in continuous tubular reactors. Thus, optimizing the reaction temperature of a given reaction is of great importance when chemical reactions are to be performed.

In analytics, nebulization/atomization/spraying is a well-known technique to feed in samples, a great number of ways is known for its realization. One of its oldest and most wide-spread forms is pneumatic nebulization, in particular concentric pneumatic nebulization by making use of a high velocity gas, a so-called combustion gas. This is used most often in flame atomic absorption spectrometry, wherein the introduced gas (e.g. air, oxygen) supplies the combustion of the flame. In conventional pneumatic nebulizers, however, a problem occurs as too large substance and gas flows will blow out the plasma flame. In order to avoid this, the flow rates of both the sample and the combustion gases have been reduced. This has been achieved by reducing the inner diameter (0.2 mm) of the capillary of the nebulizer. As a result, however, the efficacy of nebulization has suffered a radical drop as well. Moreover, due to precipitation and subsequent plugging at the end of the capillary, solutions having the concentration of above 1% by weight became generally useless.

As the resulting primary aerosol exhibits a rather heterogeneous drop size distribution, a spherical collision body is placed in front of the nebulizer. By forcing the drops of said primary aerosol to collide with this body, said drops are getting broken up further, while larger drops simply get trapped. The thus resulting secondary aerosol is then passed through a concentrically mounted, radially oriented baffle plate with a conveying gas. As a consequence, larger drops get trapped again. The drop size distribution of the thus obtained tertiary aerosol will be about 5 µm.

Ultrasonic nebulization has been elaborated to increase further the efficacy of nebulization. Its core feature is the utilization of a generator suitable for and/or capable of producing ultrasounds with frequencies falling into the frequency range from 200 kHz to 10 MHz. Waves created at the liquid/gas interface by the oscillations of the generator induce aerosol generation. The average drop size distribution arising this way depends on the surface tension and the density of the liquid to be nebulized, as well as on the frequency of the ultrasonic source. Ultrasonic nebulizers can be divided into two groups. In case of a nebulizer belonging to the first group, the solution is guided onto a chemically resistant piezoelectric crystal, while in case of the other group, a medium that transfers longitudinal (or pressure-) waves is introduced into between the solution and the piezoelectric crystal capable of oscillating. Compared to pneumatic nebulization, ultrasonic nebulization results in a more uniform drop size distribution. Moreover, the physical properties of the drops can be controlled by varying frequency of the ultrasonic source.

Spraying, especially ultrasonic spraying is most frequently used as a possible technical means in the field of coating, wherein the uniform layer thickness of a few microns, reproducibility and productivity are of huge importance. When spraying is applied, mostly inorganic materials are applied to surfaces of different geometries. A similar technique is chemical vapor deposition (CVD) which also serves for coating surfaces, mostly by a given inorganic compound at high temperature and in vacuum.

International Publication Pamphlet No. WO2012/033786 discloses a solution, wherein one or more evaporating non-polar substances are introduced into a pyrolysis deposition system in order to create a cadmium sulfide photovoltaic film. To this end, a solution is used that comprises—in dissolved state—cadmium, sulfur and at least one further selected substance. The further selected substance (alcohol) of the solution is nonpolar, evaporates faster than water, but its heat capacity is lower than that of water. Said mixture is arranged within the pyrolysis deposition system that comprises one or more spray heads and one or more heating devices. The desired layer is deposited onto a substrate whose distance from the spray head is adjustable and whose temperature can be controlled by the one or more heating devices.

According to said document, although a spraying/nebulizing method is carried out in the pyrolysis deposition system, no organic chemical reactions take place in this case as the applied process is substantially based on inorganic substances. Furthermore, no chemical conversion occurs when the procedure is completed.

U.S. Publication Pamphlet No. US20030230819 teaches a method for microencapsulating pharmaceutical ingredients with low molecular weight by means of ultrasonic atomizers. The applied apparatus comprises a coaxial atomizer, two liquid inlets and an ultrasonic generator. One liquid flows through an inner nozzle and the other liquid flows through an outer nozzle. Both flows pass through the same atomizing surface, wherein the mixture is broken up into micro droplets due to the vibration energy. The thus obtained particle size distribution is between 1 to 100 μm. The ultrasonic atomizer operates at low energies, and therefore it does not damage biological matter, e.g. blood, antibodies and bacteria.

Said process takes place at low temperature in the presence of two systems being mixed, the object is to get the active ingredient coated. No organic chemical reaction takes place under circumstances that are typical for pyrolysis. Furthermore, the ultrasonic spraying system has been used to achieve optimal mixing and particle size; the use of ultrasonic spraying to increase chemical activity is neither mentioned nor hinted at in said document.

International Publication Pamphlet No. WO2013/050402 reports on a device that is capable of producing organic metal-containing compounds and catalysts, named metal organic frameworks (MOF). Generally, a hydrothermal process is applied, wherein crystals are being grown slowly from a hot metallic (e.g. a metal salt) solution. As the crystals grow slowly and in a reversible manner, there is a high chance of forming defects therein. If this happens, the crystal has to be dissolved again, which results in crystals falling into the size range of milli- and micrometers. Said document also discloses a method wherein at least one metal ion and at least one organic ligand with a valence of two are being supplied into a spray dryer in the presence of a solvent. The mixture passes through a nozzle and the drops thus forming are being dispersed by hot gas. As a result, the reaction time required for the synthesis significantly reduces, dry crystals can be collected, and filtering and further processing steps can be avoided.

The production method, which has significantly improved efficacy compared to the previous methods, covers merely the temperature range of 80 to 200° C. Moreover, it applies no ultrasonic spraying unit, as the objects to be achieved do not include the small particle size distribution and the increase in the reactivity of the reaction mixture.

The spray pyrolysis technique is also known from applications used to dispose hazardous materials. In particular, U.S. Pat. No. 5,359,947 teaches a system for destroying packaged hazardous and toxic medical waste by means of molten metal heated to 800° C. The reactor comprises a two-part pyrolysis unit and a bottom outlet for the molten metal that leads from a first combustion chamber to a second one, into which the packages are fed. Glass objects melt on the surface of the molten metal, corrosion-resistant steel, e.g. the material of injection needles, and further metal objects get dissolved, organic materials get burnt and disintegrate into their constituents. The path of the pyrolysis products is heated to 250° C., and thus any pathogens and hazardous materials are destroyed in the described system.

In case of waste destruction, there is, generally, no need to control sophisticated reaction paths by means of changing the temperature, flow rate and other parameters. Thus, the use of spray pyrolysis in this field cannot be compared with the technique to be described in detail in what follows.

OBJECT OF THE INVENTION

According to the aforementioned, it seems that the spray technique is not widely spread in common organic chemistry laboratories to perform thermal organic chemical reactions. The reason for this is, among others, the limited availability and immaturity of said technique.

In light of the prior art it is also apparent, that no devices capable of spraying, that is atomizing/nebulizing dissolved and/or solid phase substances and thus performing mono- and bimolecular reactions in a pyrolysis system with or without the application of an inert or reagent gas exist at the time being.

Accordingly, the object of the present invention is to provide an apparatus with an ultrasonic spraying unit, i.e. an atomizer/nebulizer, for carrying out vacuum flash pyrolysis (VFP) reactions, and particularly a fluidic reactor of this type.

In general, a room temperature mixture of initial reactants is fed into the fluidic reactor by means of a pump, then said mixture is heated up to a suitable temperature within the reactor, the desired chemical reaction takes place at this elevated temperature and then the reaction mixture is cooled down and led out of the reactor for further processing. Fluidic reactors require the use of devices and apparatuses which are mostly known in the field of high performance liquid chromatography (HPLC), since HPLC devices also handle small liquid volumes at high pressures and in continuous flow. Therefore, components identical with or very similar to the units of HPLC devices, e.g. pumps, pipes, receptacles, detectors, etc. can be used in (micro)fluidic reactors, too. Accordingly, unless stated otherwise in relation to the fluidic reactor according to the present invention, from now on, the term "HPLC device" refers to a HPLC device known by a person skilled in the art. For example, when a pump of the fluidic reactor of the present invention is referred to unless stated otherwise a HPLC pump known in the prior art is meant.

In line with the aforementioned, another object of the present invention is to provide a process making use of an apparatus for carrying out basically—but not exclusively—VFP reactions (from now on: a VFP apparatus), said process being suitable for performing organic chemical reactions over a broader scale as to temperature and/or pressure, preferably in a temperature range extending from room temperature to 1000° C. and/or in a pressure range extending from $10^{-3}$ mbar to 400 bar.

A yet further object of the invention is to develop a fluidic reactor that is capable of performing VFP reactions and is a continuous flow and laboratory scale reactor classifiable preferably as mesofluidic reactor.

A yet further object of the present invention is to construct a spraying (atomizing) means for the inventive apparatus and process, and especially for the above inventive fluidic reactor, which, on the one hand, is capable of providing an uniform particle size distribution as desired, i.e. falling into the nano and micron size range, when spraying of solutions takes place and, on the other hand, can be used not only to atomize solutions, but is also applicable to bring hardly or non-soluble solid state substances into thermal reactions.

The above objects are achieved by a mesofluidic reactor according to claim 1. Further preferred embodiments of said reactor are set forth in claims 2 to 15.

In particular, in one aspect, the object of the present invention is achieved by a continuous flow reactor comprising a thermally insulated multi-zone heating unit, a reactor tube, a tubing and a HPLC pump for transporting the starting material (liquid), inert/reagent gas, a control valve for controlling the direction of inert/reagent gas, a mass flow meter for measuring and controlling inert/reagent gas, a pressure gauge, a container for storing solid material (or a solids container), a product trap for collecting converted material, a vacuum tap for enabling the use of vacuum, as well as a vacuum pump (a unit for measuring and controlling the degree of vacuum) and a high-pressure spraying head equipped with an ultrasound generating piezoelectric crystal unit and a nozzle.

More specifically, a multifunctional apparatus has been developed, wherein the starting material to be converted is brought into gas-/vapor phase (that is, in particular, evaporated and/or sublimated) at a given degree of vacuum and at a certain temperature. The product obtained in the conversion is condensed in a preheated region making use of a VFP apparatus, in which chemical conversion is facilitated at high temperature with a contact time of milliseconds by crossing large energy barriers. A VFP system can be generally used to monomolecular conversions, because the mean free path typically favors intramolecular reactions if vacuum is applied. An ultrasonic spraying module (or a pneumatic spraying module, as one can also refer to it) also forms part of the multifunctional apparatus according to the invention; in said module bimolecular (intermolecular) chemical reactions can also be performed along with feeding an inert/reagent gas.

Furthermore, a high-pressure (400 bar) and high-temperature (600° C.) module for performing heterogeneous catalytic, bimolecular and multiphase chemical processes has been worked out as well.

In particular, an ultrasonic VFP apparatus with three modules has been developed, the apparatus extends the range of applicable parameters, concerning the temperature from room temperature to 1000° C. and concerning the pressure from $10^{-3}$ mbar to 400 bar.

The pneumatic spraying module equipped with an ultrasonic spraying head that forms part of the inventive VFP apparatus, implemented as a mesofluidic reactor, is provided by a unit that is capable of atomizing both a liquid phase reagent solution and a solid substance, in combination with feeding inert and/or further reagent gases at the temperature of 1000° C. into the apparatus. Said module is thus suitable for bringing non-volatile substances into reaction, as well as carrying out bimolecular and homogeneous catalytic reactions in liquid and vapor phases. Considering the HPLC pump, the inner diameters of the tubings and the nature of flow, feeding of the starting materials falls into the microfluidic regime. The applied pneumatic spraying module thus has the advantage that the amount of material introduced into the reaction volume per unit time can be well traced and calculated as a function of flow rate and concentration.

The pneumatic spraying module forming part of the inventive VFP apparatus, implemented as a mesofluidic reactor, is also suitable for atomizing hardly or non-soluble substances in the solid state. Due to mechanical movement of the one or more electrically driven piezoelectric crystals in the pneumatic spraying head, particulate solid materials with larger particle sizes (of e.g. micron, mm) get broken up. Intensity of the mechanical movement can be varied by the emission frequency of the applied piezoelectric crystal(s). The one or more piezoelectric crystals produce heat that can also be used to cover heat requirement of the sublimation of the solid substance. The solid substance thus broken up maintains a cushioning pressure of 0.2-0.3 bars in the container while being fed into the reaction volume wherein, simultaneously with its passing through the reaction volume, the desired/planned chemical transformation/conversion takes place.

The basis for the successful conversion is that molecules exiting from the pneumatic spraying head equipped with the ultrasonic sprayer of preferred design with high velocities are further accelerated by the carrier gas and thus the reaction takes place in the high-temperature reactor only in a few milliseconds (ms). Guiding the substance and increasing or decreasing, i.e. controlling its residence time are preferably effected by applying vacuum and adjusting the flow rate of the carrier/reagent gas introduced. Due to the extremely short residence time, the substance to be reacted does not suffer thermal decomposition. The present inventive VFP apparatus with ultrasonic spraying, which is preferably a mesofluidic reactor, operates in a wide parameter range and thus broadens the scope of feasible chemical reactions. The ultrasonic spraying unit of the apparatus with high efficacy of nebulization and the variability of the introduced inert/reagent gases allow to perform further types of reactions.

By the ultrasonic spraying unit, solutions with low or medium concentration can be handled. The apparatus according to the invention is suitable for introducing solid materials through an ultrasonic spraying head along with applying inert/reagent gases or vacuum.

In our studies we have come to the unexpected conclusion that non-evaporable substances show high reactivity even if micron and not nano sized particles are brought into reaction.

In light of the aforementioned, the VFP apparatus, implemented as a mesofluidic reactor, has the following advantageous features:

- It is suitable for carrying out mono- and bimolecular reactions in the temperature range from room temperature to 1000° C. with residence times of ms, while a spiral flow of the introduced inert gas along the wall of the reactor tube specifies the direction of the material flow and prevents collisions between the material and the reactor wall.
- Its inner dimensions (i.e. the diameters of its cylindrical flow cross-sections) fall into the size range extending from a few mm to the order of cm, and wherein it is also possible to bring hardly or non-soluble solid substances also into reaction in such a way that the ultrasonic source provides thermal energy required for sublimating said solid substance and then the introduced gas/vacuum guides the substance through the reaction volume.
- Further to inert gases, other reagent gases can also be introduced into it as carrier gases with known and controlled flow rates.
- The spraying head is combined with an ultrasonic unit and a pneumatic unit so as to allow a uniform particle size distribution (>20 μm).
- The waste heat of said ultrasonic unit of the spraying head is preferably used to preheat the introduced gas, the ultrasonic unit thus functions as a heat exchanger for input gas, that helps to maintain the temperature of the reaction zone and to prevent undesired cooling thereof.

The obtained products are collected in an appropriately cooled product trap/product condenser, said cooling is preferably achieved by means of the mixture of dry ice and acetone or a chiller filled with this mixture, liquid nitrogen or other solvents, a Peltier element, a quencher, a reflux cooler or any other kind of heat-exchanger as known by a person skilled in the art. Said product trap can be constructed with water cooling as well.

The flow rate of the solution of the starting material can be varied, the technical construction is insensitive of the type of the solvent.

The spray pressure of the solution of the starting material ranges from atmospheric pressure to 400 bar.

Heating of the reaction volume (preferably the reactor tube 12) of the reactor includes at least three separately detected and controlled zones $T_1$, $T_2$, $T_3$. Different temperatures of said furnace zones are provided by dividers designed specifically for this purpose.

Heating of the reactor tube in the apparatus takes place on the basis of an indirect heating principle which allows a uniform temperature distribution along the total length of the reactor tube zone by zone. This construction allows a pretty quick temperature adjustment, and thus it prevents the formation of an adverse temperature gradient within the reaction mixture.

DETAILED DESCRIPTION OF THE DRAWINGS

In what follows, the present invention is discussed in detail with reference to the accompanying drawings, wherein.

DETAILED DESCRIPTION OF THE INVENTION

Figure 1:
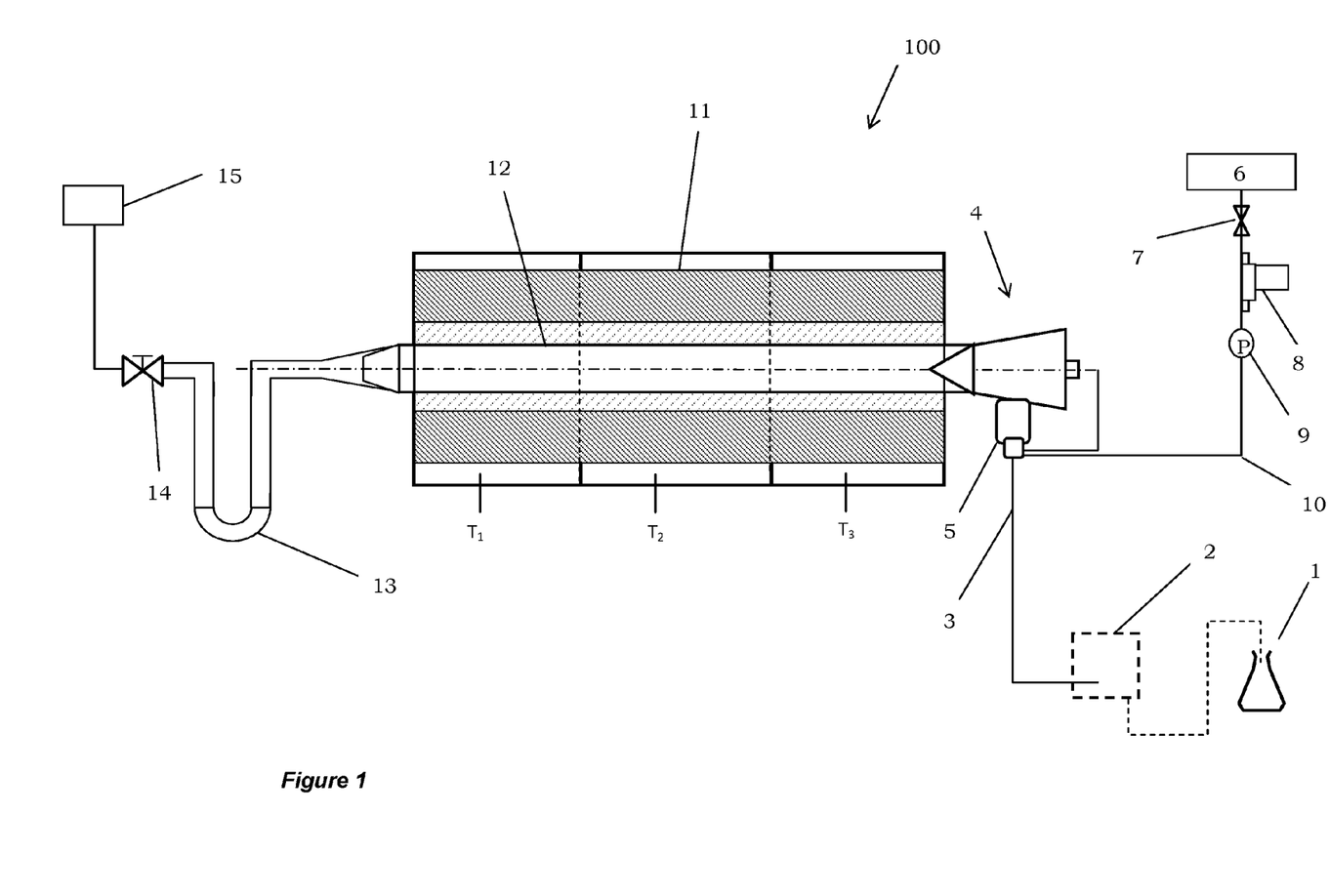
FIG. 1 illustrates a preferred exemplary embodiment of a VFP apparatus implemented as a mesofluidic reactor according to the invention in a schematic sectional representation.

The VFP apparatus implemented preferably as a high-temperature mesofluidic reactor according to the invention is illustrated in FIG. 1. According to FIG. 1, components of the inventive apparatus—in line with its two different operational modes (i) and (ii) (i.e. atomization of a solution and/or a solid material, respectively)—are connected as follows.

(i) A (liquid phase) starting material is arranged in a container 1, said container 1, optionally and if required, is connected through a pump 2 suitable for transporting liquids, preferably a HPLC pump and a tubing 3 suitable for transporting liquids to a high-pressure spraying head 4 (see FIG. 2) equipped with a piezoelectric crystal unit (that emits preferably in the ultrasound range) and a nozzle with a spraying tip that has an inner diameter of preferably 0.5 mm, more preferably of 0.2 mm, and most preferably about 0.1 mm. Feeding of the starting material into the spraying head 4 takes place through the tubing 3, optionally by means of operating the pump 2. The spraying head 4 is connected through a conduit 10 to a gas source 6 of inert and other reagent gas, wherein said gas source 6 is provided by e.g. one or more gas cylinders or gas generators (in situ gas generation) or a combination thereof. In the flow path of the inert and other reagent gas defined by the conduit 10 and directed from the gas source 6 towards the spraying head 4 a control valve 7, a mass flowmeter 8 and a pressure gauge 9 are arranged one after the other in the direction of gas flow. The spraying head 4 is connected to the entrance side of the, preferably, tubular reactor tube 12 of the apparatus according to the invention in a sealed manner. To adjust the temperature of the reaction volume defined/surrounded by said reactor tube 12 as desired, said reactor tube 12 is disposed in its entire length inside a heating unit 11. Exhaust side of the reactor tube 12 opens into a cooled product trap 13 that serves for cooling and thus condensing/precipitating the converted substance exiting from the hot reaction volume. Finally, a vacuum tap 14 and a vacuum pump 15 are connected to the outlet of the product trap 13.

(ii) The inert and other reagent gas enters from the gas source 6 through the control valve 7, the mass flowmeter 8 and the pressure gauge 9 via said conduit 10 into a solids container 5 which, in this case, contains a solid phase starting material; here, said solids container 5 is connected directly to the spraying head 4 substantially at a right angle from below. Furthermore, the spraying head 4 is directly connected to the entrance side of the reactor tube 12. Said reactor tube 12 is disposed in its entire length inside the heating unit 11. The exhaust side of the reactor tube 12—similarly to operational mode (i)—opens into the cooled product trap 13 that serves for cooling and thus condensing/precipitating the converted substance exiting from said reactor tube 12. Again, a vacuum tap 14 and a vacuum pump 15 are connected to the outlet of the product trap 13.

The average diameter of the reactor tube 12, i.e. the reaction volume delimited by said reactor tube 12 is at least 10 mm, preferably is at least 15 mm or more, while its length can be chosen arbitrarily in a range that extends from 10 mm to 2000 mm. An advantage of the relatively large inner diameter of the reaction volume is that, optionally, it can be divided up among several reactor tubes parallel to each other. This means that more than one reactor tubes 12 can be arranged at a time within the heating unit 11. In such a case, naturally, modifications are required at the entrance and exhaust sides of the chemical mesofluidic reactor 100 according to the present invention (as to e.g. the number and arrangement/connections of the spraying units or the product trap). Said reactor tube/reactor tubes 12 are preferably made of a material selected from the group of borosilicate, quartz, Pyrex glass, corrosion-resistant steel and Hastelloy materials.

The product trap 13 for collecting the converted substances is preferably provided in the form of a precooled large surface area condenser or solvent absorber. The inert/reagent gas can be any of hydrogen, nitrogen, oxygen, etc. The mass flowmeter 8, the control valve 7 and the pressure gauge 9 serve for controlling the pressure and the flowing of the inert/reagent gas. To guide the flow of substance and to reduce the residence time, the vacuum pump 15 is applied. Those components of the apparatus which are used to feed the liquid phase starting materials belong to the microfluidic range (in terms of their respective parameters). Feeding of solid phase starting materials is performed by said solids container 5 through suitable and known ways/means.

Figure 2:
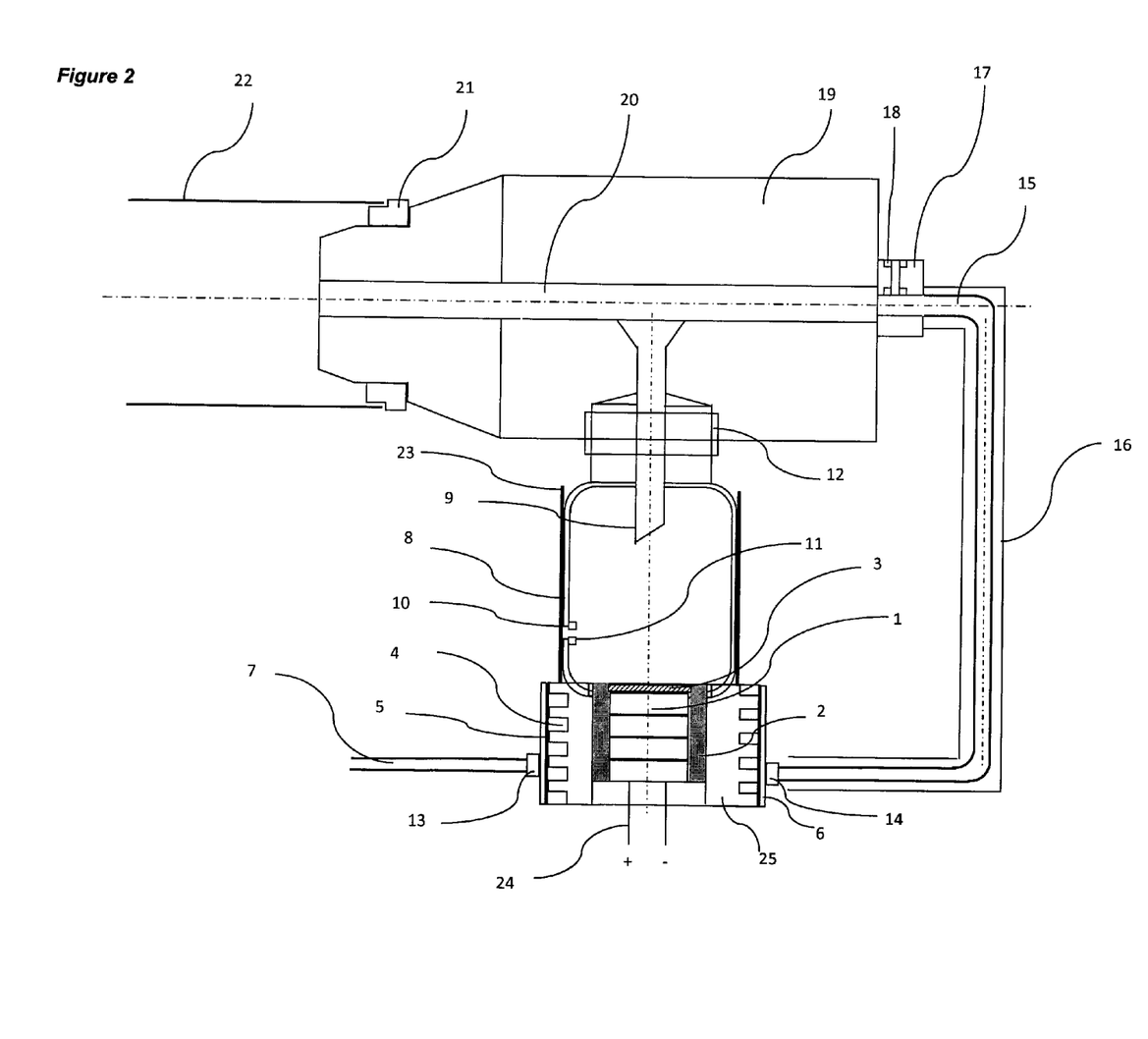
FIG. 2 shows a possible exemplary embodiment of the pneumatic spraying module used in the VFP apparatus according to the invention in a schematic sectional representation.

Construction of the pneumatic spraying module with an ultrasonic spraying head of the VFP apparatus implemented as a mesofluidic reactor according to the invention is shown in FIG. 2.

The ultrasonic spraying head 4 used in the inventive VFP apparatus implemented as a mesofluidic reactor comprises an atomizer 19 and an ultrasonic unit 25 communicating with each other, on the one hand, through a feedstock container 8 and, on the other hand, through a thermally insulated gas pipe 15 that serves for transporting inert/reagent gas.

Liquid and/or solid phase starting materials are provided in said feedstock container 8. The ultrasonic unit 25 includes one (optionally more than one) piezoelectric crystal(s) 1. To receive volumetric changes arising due to mechanical work, the at least one piezoelectric crystal 1 is sheathed with a padding 2. To assure chemical resistance, a surface of the piezoelectric crystal 1 that contacts the starting material is covered with a ceramic plate 3. The ultrasonic unit 25 of the apparatus according to the invention also functions as a heat exchanger. To this end, the piezoelectric crystal 1 sheathed with said padding 2 is enclosed in the form of a cylindrical envelope by an aluminum block having equally spaced grooves 4, wherein the 4 grooves are formed in a side of said block facing away from the piezoelectric crystal 1 (i.e. in the outer side of the block). To provide gas-tightness, the grooves 4 are covered with a polymer/PTFE sealing jacket 5 that thrusts against the surface of the aluminum block. Outer surface of the sealing jacket 5 is enclosed cylindrically and supported by a close fitted aluminum/steel casing 6 that also ensures pressure-tightness of the thus obtained unit serving as a heat exchanger in operation. The inert/reagent gas enters the ultrasonic unit 25 via a gas inlet 7 of said unit and through a gas entrance connection 13 of the unit. This way the inert/reagent gas passes into a groove 4 which is in communication with the gas entrance connection 13. Here preheating of the inert/reagent gas takes place by employing the heat (which is adverse to the reaction in certain cases) generated during the operation of the piezoelectric crystal 1 to preheat the in-flowing inert/reagent gas; the in-flowing inert/reagent gas flows along the groove 4 formed preferably helically, absorbs thereby heat produced by said piezoelectric crystal 1 and gets warm. Next, said inert/reagent gas exits through a gas exhaust connection 14 of the ultrasonic unit 25, passes along the gas pipe 15 and then enters the atomizer 19 through a connecting and thermometer-fitting block 17. Said gas preheating can also be realized by inserting a gas transporting tube of suitable (practically small) diameter made of a suitable structural material into the groove 4. Here, a significant drop in heat transfer efficacy should be also taken into account.

The atomizer 19 is made of a structural material chosen preferably form the group of corrosion-resistant steel, quartz, borosilicate, Pyrex glass, Hastelloy materials, PEEK material and Teflon.

The inert/reagent gas passing through a capillary 20 formed in the atomizer 19 with high velocity creates vacuum. The thus produced vacuum sucks up the small-sized particulate substance broken up into small particles by the ultrasonic unit 25 and/or sublimated by the heat generated on the surface of the piezoelectric crystal 1 and the ceramic plate 3 from the feedstock container 8 via a feedstock tube 9 extending substantially perpendicularly to the capillary 20 and opening into said feedstock container 8. Said vacuum then transports the particulate substance towards the reactor tube 22 by spraying/atomizing it into the flow, wherein the reactor tube 22 is connected to the atomizer 19 along a sealing ring 21 in an airtight manner. To increase nebulization efficacy, in case of a solution, the solution is subjected to dynamical mechanical impacts exerted by the at least one piezoelectric crystal of said ultrasonic unit 25. Due to this, liquid drops leave the surface of the solution, which are brought into motion and then transported towards the capillary 20 and then the reaction tube 22 by the vacuum developing in the feedstock tube 9 due to the flow of the inert/reagent gas.

The feedstock container 8 is connected to the atomizer 19 through a threaded connection 12. To avoid precipitation of the sublimated material on the cold spots, said connection is enclosed by a tempering jacket 23. If the amount of heat dissipated by means of preheating the inert/reagent gas is too small, said tempering jacket 23 can be cooled on its outer side. Thus, evaporation of the solution from the surface of the ceramic plate 3 taking place due to the heat produced when the piezoelectric crystal 1 operates can be simply avoided. The temperature in the feedstock container 8 is measured by a thermometer which is directed through a thermoelement-fitting opening 10 and sealed to the feedstock container 8 by an appropriate sealing ring.

Based on the temperature data measured by a thermometer sealed through a sealing 18 in said connecting and thermometer-fitting block 17, the temperature of the inert/reagent gas is also controlled by means of a thermal insulation/pipe-heating 16 prior to the entry of said inert/reagent gas into the atomizer 19. To ensure that inert/reagent gas of a desired temperature arrives at the atomizer 19, compensation of the heat loss of said gas and additional heating of the gas take place in the gas pipe 15 as a function of the measured temperature data. Thereby, the temperature gradient over the reaction volume can be reduced at an entry point of said reaction volume.

The piezoelectric crystal 1 is energized continuously, or rather periodically through an electric connection 24 by a voltage that is matched with the type of said piezoelectric crystal. When the ultrasonic unit 25 is actuated, it is capable of operating only in a single frequency range at a time. The piezoelectric crystal 1 is formed as a replaceable unit which can thus be changed depending on the frequency to be achieved. Actuation takes place by applying a given voltage to said piezoelectric crystal, wherein the voltage is regulated by a square signal. Depending on the duty cycle of the square signal, the sonic waves will be continuous or dynamic, pulsed.

The VFP apparatus, implemented as a mesofluidic reactor, with an ultrasonic spraying head is susceptible for being used basically in two application fields: (i) to atomize solutions with small particle size distributions in the micron regime in such a way that the waste heat is used to preheat the inert/reagent gas, and (ii) to nebulize/sublimate hardly or non-soluble solids. It is apparent to a person skilled in the art, however, that the present apparatus can also be used in other application fields differing from the ones defined above without significant modifications as to its structural unity and, therefore, without going beyond the scope of protection claimed below.

In operational mode (i), the solution of the starting material enters the ultrasonic spraying head 4 from below—it is transported by the pump 2 or due to Venturi's principle. The solution enters the reactor tube through a tube/capillary with a diameter of about 0.2 mm at a pressure that builds up as a consequence of the resistance of the system. Inert/reagent gas is fed into the system along the entire periphery of said capillary which reduces, disperses the size of the liquid drops entering the reaction volume. To decrease the particle size distribution of said liquid drops further, the ultrasonic spraying head 4 is operated at a (n operational) frequency that can be freely varied between 500 kHz and 5 MHz; this way the degree of atomizing is controlled. The live piezoelectric unit generating ultrasounds produces heat during its operation. This waste heat is used to preheat the introduced inert/reagent gas in order to reduce the temperature gradient due to the inflow gas. To achieve good heat transfer, a mechanical coupling is established between the piezoelectric crystal(s) utilized and the tube/coil of tube by e.g. bringing said elements into direct or indirect contact; said indirect contact is realized e.g. by means of inserting a material with good thermal conductance between said piezoelectric crystal(s) and said tube/coil of tube. This way the desired degree of warming-up of the gas is ensured.

In operational mode (ii), a cushioning pressure of about 0.2-0.3 bars is generated and maintained in the solids container 5 connected to the ultrasonic spraying head 4 from above by means of the inert/reagent gas introduced through the valve 7 and the pressure gauge 9. By exploiting mechanical work of the piezoelectric crystal(s), the particle size distribution is reduced from the millimeter range and/or the range of several hundreds of microns into the range of 100 to 250 µm. This way, on the one hand, the substance can be handled as a solid fluid (i.e. a fine powdered material) and, on the other hand, the heat generated on the surface of the piezoelectric crystal(s) induces sublimation of said substance; the thus obtained gaseous substance is then entrained by the inert/reagent gas providing the cushioning pressure and flows into the reaction volume.

Heating of the heated rector tube 12 is provided by indirect heating (by e.g. infrared radiation, heating cartridges, heating filaments, hot air blowing, etc.); thus, any temperature between room temperature (here, about 20 to 25° C.) and at least about 1000° C. can be achieved within the reaction volume. Said heated reaction volume is surrounded by multiple layers of insulation with low heat transmission coefficient. Temperature of the furnace comprising multiple separate reactor zones is measured by at least one temperature sensing means per zone, preferably, by a temperature sensor arranged in the given zone of the furnace chamber.

The reactor tube 12 of mesofluidic size range to be heated to high temperatures is arranged inside the heating unit 11 along its entire length, wherein said ultrasonic spraying head 4 is located at the entrance side, while the pre-cooled large surface area substance-precipitating/-condensing product trap 13 at the exhaust side of said heating unit 11.

Optionally, a vacuum pump 15 is utilized for directing the flow of substance and reducing the residence time further; said vacuum pump 15 can be connected to the outlet of the substance-precipitating/-condensing product trap 13 by means of e.g. a suitable tubing.

A preferable exemplary embodiment of the VFP apparatus, implemented as a mesofluidic reactor, with ultrasonic spraying means according to the invention exhibits the following non-limiting technical parameters:
 temperature range: between room temperature, i.e. about 20 to 25° C. and 1000° C.;
 accuracy of temperature control: ±3% up to 100° C., and ±2% from above 100° C. and up to 1000° C.;
 nominal pressure: between $10^{-3}$ mbar and 3 bar;
 flow rate of inert/reagent gas: 1 to 10000 ml/min;
 flow rate of solution: 0.1 to 1000 ml/min;
 pressure of solution: between about 1 bar (atmospheric pressure) and 400 bar;
 applied ultrasonic frequency: between 500 kHz and 5 MHz; and
 reactor size: 500×26 mm.

In what follows, some chemical reactions performed in the chemical reactor equipped with an ultrasonic spraying means according to the invention, as well as related measurement results are discussed in more detail. It is obvious to a person skilled in the art that said chemical reactor is also suitable to carry out other chemical reactions as well if appropriately modified (in terms of e.g. pressure, temperature, etc.). Accordingly, the chemical reactions discussed below should only be taken as examples that do not limit the scope of application of the inventive chemical reactor.

EXAMPLES

Example 1: Gould-Jacobs 6π Electrocyclization Reaction

| | VFP | UVFP |
|---|---|---|
| Reactor temperature (° C.) | 450 | 450 |
| Preheating temperature (° C.) | 150 | — |
| Reactor length (mm) | 500 | 500 |
| Reactor diameter (mm) | 26 | 26 |
| Pressure | $10^{-3}$ mbar | 3 bar |
| Solution flow rate (ml/min) | — | 0.5 |
| $N_2$ gas flow (l/min) | — | 2 |
| Ultrasound frequency (MHz) | — | 1.7 |
| Solvent | — | DMA (dimethylacetamide) |
| Conversion (%) | >99 | >99 |
| Isolated yield (%) | 80 | 91 |
| NMR purity (%) | >95 | >98 |

A Gould-Jacobs 6π Electrocyclization Experiment Performed in a Vacuum Flash Pyrolysis (VFP) Device An amount of 200 mg of the starting material was measured into the distillation flask of the device. Then the temperature-control unit of the preheater was set to 150° C., and that of the reactor to 450° C. After achieving and the stabilization of the values set, a vacuum of $10^{-3}$ mbar was created in the system. Due to the temperature and vacuum, the starting material starts to sublimate and a few seconds later a product obtained from the reactor appears in the product trap which is precooled to −78° C. and is disposed at the outlet of the reactor tube of 500 mm in length. The product obtained is dissolved from the trap by alcohol and/or dichloromethane, and then is evaporated. If necessary, the product is subjected to further purification.

A Gould-Jacobs 6π Electrocyclization Experiment Performed in an Ultrasonic Vacuum Flash Pyrolysis (UVFP) Device An amount of 1390 mg of the starting material was measured into the distillation flask, and is then solved in 50 ml of dimethylacetamide (DMA). This way a solution having a concentration of 0.1M was obtained. The temperature-control unit of the reactor was set to 450° C. The flow rate of the solution WAs set to 0.5 ml/min, the nitrogen gas flow was set to 2 l/min and the frequency of the ultrasonic unit was set to 1.7 MHz. A few seconds after the flow of the solution has been started by the HPLC pump, a product to be collected appears in the large surface area product trap which is precooled to −78° C. As soon as the solution of the starting material has run out at the inlet, the product was drained off said trap and evaporated. If necessary, the product is subjected to further processing.

Figure 3A:
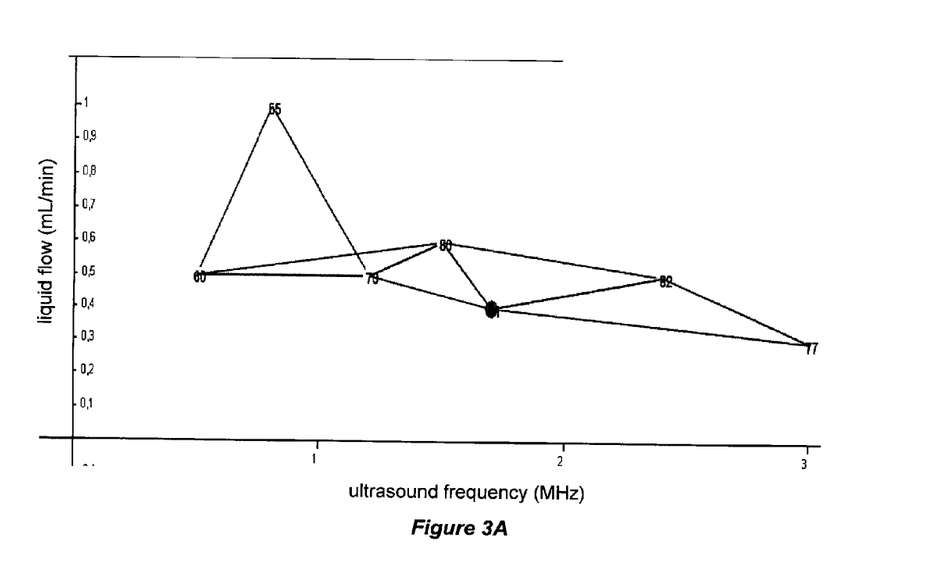
FIGS. 3A and 3B show graphically and in tabular form, respectively, the isolated yields as the function of liquid flow and ultrasound frequency for a Gould-Jacobs 6π electrocyclization reaction (further details of which are discussed in relation to Example 1) performed by a VFP apparatus implemented as a mesofluidic reactor according to the present invention.
Figure 3B:
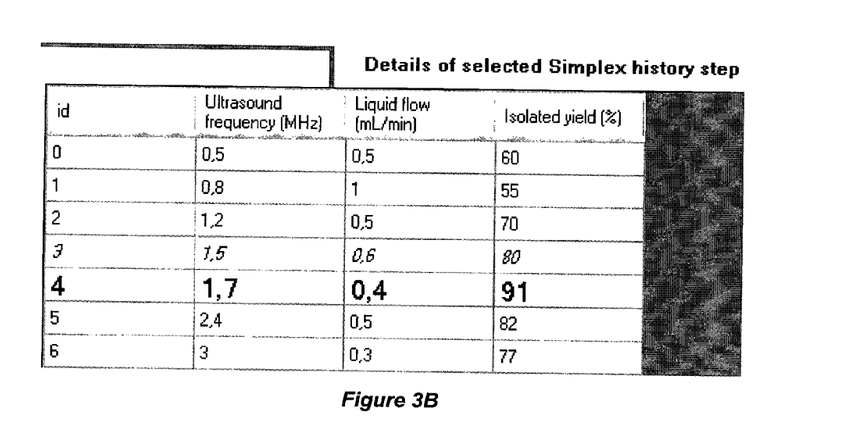

FIGS. 3A and 3B illustrate graphically and in tabular form, respectively, the isolated yields for a Gould-Jacobs 6π electrocyclization reaction as the function of the applied flow rate and frequency in case of a VFP apparatus implemented as a mesofluidic reactor according to the invention. When optimizing (Simplex method), only the liquid flow rate and the ultrasound frequency have been changed; all other parameters have been kept unchanged. The obtained measurement results clearly show that the application of ultrasounds exerts an optimizing effect on the course of reaction in case of e.g. the aforementioned chemical reaction, that is, the isolated yield can be maximized if ultrasounds are applied.

Example 2: Conrad-Limpach Cyclization Reaction

| | VFP | UVFP |
|---|---|---|
| Reactor temperature (° C.) | 450 | 450 |
| Preheating temperature (° C.) | 150 | — |
| Reactor length (mm) | 500 | 500 |
| Reactor diameter (mm) | 26 | 26 |
| Pressure | $10^{-3}$ mbar | 2 bar |
| Solution flow rate (ml/min) | — | 0.4 |
| $N_2$ gas flow (l/min) | — | 2 |
| Ultrasound frequency (MHz) | — | 2 |
| Solvent | — | DMA (dimethylacetamide) |
| Conversion (%) | >99 | >99 |
| Isolated yield (%) | 60 | 75 |
| NMR purity (%) | >95 | >95 |

A Conrand-Limpach Cyclization Experiment Performed in a Vacuum Flash Pyrolysis (VFP) Device An amount of 200 mg of the starting material was measured into the distillation flask of the device. Then the temperature-control unit of the preheater was set to 150° C., and that of the reactor to 450° C. After achieving and the stabilization of the values set, a vacuum of $10^{-3}$ mbar was created in the system. Due to the temperature and vacuum, the starting material starts to sublimate and a few seconds later a product obtained from the reactor appears in the product trap which is precooled to −78° C. and is disposed at the outlet of the reactor tube of 500 mm in length. The product obtained is dissolved from the trap by alcohol and/or dichloromethane, and then is evaporated. If necessary, the product is subjected to further purification.

A Conrand-Limpach Cyclization Experiment Performed in an Ultrasonic Vacuum Flash Pyrolysis (UVFP) Device An amount of 1050 mg of the starting material was measured into the distillation flask, and is then solved in 50 ml of dimethylacetamide (DMA). This way a solution having a concentration of 0.1M was obtained. The temperature-control unit of the reactor was set to 450° C. The flow rate of the solution was set to 0.4 ml/min, the nitrogen gas flow was set to 2 l/min and the frequency of the ultrasonic unit was set to 2.0 MHz. A few seconds after the flow of the solution has been started by the HPLC pump, a product to be collected appears in the large surface area product trap which is precooled to −78° C. As soon as the solution of the starting material has run out at the inlet, the product was drained off said trap and evaporated. If necessary, the product is subjected to further processing.

In light of the present teaching, it is apparent to a person skilled in the art that the ultrasonic VFP apparatus implemented preferably as a mesofluidic reactor according to the invention is suitable for performing other chemical reactions than VFP reactions as well.

The invention claimed is:

1. A mesofluidic reactor to perform a chemical reaction of a starting material, wherein components of the reactor are combined together depending on phase state of the starting material to form said reactor, the mesofluidic reactor comprising:
   (i) in case of a liquid phase starting material,
   a container (1) to store said liquid phase starting material,
   a high-pressure spraying head (4) equipped with an ultrasound generating piezoelectric crystal unit and having a nozzle,
   a tubing (3) to provide fluid communication between the container (1) and the spraying head (4),
   a reactor tube (12) with an inlet and an outlet,
   a heating unit accommodating said reactor tube (12), wherein
      the spraying head (4) is connected to the inlet of the reactor tube (12),
      the outlet of the reactor tube (12) is connected to a cooled product trap (13) to collect conversed substances, and
      the product trap (13) having an outlet connected to a vacuum tap (14) and a vacuum pump (15) to facilitate the use of vacuum,
   a gas source (6) to provide an inert/reagent gas,
   a gas conduit (10) to provide gas communication between the gas source (6) and the spraying head (4) to feed inert/reagent gas from said gas source (6) into said spraying head (4), wherein a control valve (7), a mass flowmeter (8) and a pressure gauge (9) are inserted in this order, into said gas conduit (10), or (ii) in case of a solid phase starting material,
a solids container (5) to store said solid phase starting material,
a high-pressure spraying head (4) equipped with an ultrasound generating piezoelectric crystal unit and having a nozzle, wherein,
said solids container (5) is connected essentially from below and at right angle to said spraying head (4),
a reactor tube (12) with an inlet and an outlet,
a heating unit accommodating said reactor tube (12), an inert/reagent gas is introduced from a gas source (6) through a control valve (7), a mass flowmeter (8) and a pressure gauge (9) into,
the spraying head (4) is connected to the inlet of the reactor tube (12),
the outlet of the reactor tube (12) is connected to a cooled product trap (13) to collect conversed substances, and
the product trap (13) having an outlet connected to a vacuum tap (14) and a vacuum pump (15) to facilitate the use of vacuum,
a gas source (6) to provide an inert/reagent gas,
a gas conduit (10) to provide gas communication between the gas source (6) and the solids container (5) to feed inert/reagent gas from said gas source (6) into said spraying head (4) through said solids container (5), wherein a control valve (7), a mass flowmeter (8) and a pressure gauge (9) are inserted, in this order, into said gas conduit (10), wherein
said heating unit is provided as a thermally insulated multi-zone heating unit (11);
said spraying head (4) is configured to generate a particle size distribution with nano and micro sized particles in case of the liquid phase starting material and a particle size distribution with nano, micro or even larger sized particles in case of the solid phase starting material; and wherein the gas conduit (10) is arranged to be heated, in use, by waste heat produced said piezoelectric crystal unit so as to preheat the inert/reagent gas flowing through the gas conduit (10).

2. The reactor according to claim 1, wherein said spraying head (4) is configured to atomize solvents, solutions, and sublimated non-soluble solids under pressure through a spraying tip of the nozzle, said spraying tip having a maximum inner diameter of about 0.5 mm.

3. The reactor according to claim 1, wherein said spraying head (4) further comprises an atomizer (19) as said nozzle and an ultrasonic unit (25) as said ultrasound generating piezoelectric crystal unit combined with the atomizer (19) so as to form a feedstock container (8) between the atomizer (19) and the ultrasonic unit (25),
wherein the atomizer (19) comprises a capillary (20) having a first end and a second end, such that the first end of the capillary (20) is formed by the nozzle, said container (8) being in communication with the capillary (20) and the ultrasonic unit (25),
wherein the ultrasonic unit (25) comprises a cylindrical envelope with an outer skirt to enclose the piezoelectric crystal unit,
wherein a gas-tightly sealed helical groove (4) is formed in the outer skirt of the cylindrical envelope, said helical groove (4) is configured to provide a gas communication between the gas conduit (10) and said second end of the capillary (20) to enable, in use, flowing through of the inert/reagent gas.

4. The reactor according to claim 1, wherein the atomizer is made of a structural material chosen from the group of corrosion-resistant steel, quartz, borosilicate, Pyrex glass, Hastelloy materials, PEEK material, and Teflon.

5. The reactor according to claim 1, wherein said starting material is arranged in said solids container (5) as a solid fine-powdered substance.

6. The reactor according to claim 1, wherein the average diameter of the reactor tube (12) is at least 10 mm.

7. The reactor according to claim 1, wherein the reactor tube comprises more than one reactor tube (12) extending parallel to one another and arranged within said heating unit (11).

8. The reactor according to claim 1, wherein said reactor tube (12) is made of a material selected from the group of borosilicate, quartz, Pyrex glass, corrosion-resistant steel, and Hastelloy materials.

9. The reactor according to claim 1 wherein said reactor tube (12) has a length in a range of 10 mm and 2000 mm.

10. The reactor according to claim 1, wherein said reactor tube (12) is configured to be evacuated by the vacuum pump (15) so as to perform chemical reactions under reduced pressure and to control residence time.

11. The reactor according to claim 1, wherein the reactor is configured to allow variable atomization time for a solution of the starting material.

12. The reactor according to claim 1, wherein the product trap (13) or product condenser is provided as a water cooled chiller or a chiller filled with a mixture of dry ice and acetone, liquid nitrogen, a reflux cooler, a Peltier element, or any other kind of heat-exchanger.

13. The reactor according to claim 1, wherein said heating unit (11) is configured to provide indirect heating of said each reactor tube (12) arranged therein on a zone by zone basis.

14. The reactor according to claim 1, wherein the piezoelectric crystal unit comprises at least one piezoelectric crystal having a form of a replaceable unit to enable operation of the piezoelectric crystal unit at various frequencies as desired.

15. The reactor according to claim 1, wherein an HPLC pump or an other pump (2) for transporting fluids is inserted into the tubing (3) between the container (1) and the spraying head (4).

16. The reactor according to claim 1, wherein said ultrasound generating piezoelectric crystal unit is configured to be driven by a square signal regulated voltage applied to said unit.

17. The reactor according to claim 1, wherein the piezoelectric crystal unit of the spraying head (4) is operated at a frequency freely variable between 500 kHz and 5 MHz.

18. The reactor according to claim 1, wherein the reactor tube (12) is connected to the nozzle of the spraying head (4) or the respective spraying head (4) in an airtight manner.

* * * * *